US008145678B2

(12) United States Patent
Ramsay, Jr. et al.

(10) Patent No.: US 8,145,678 B2
(45) Date of Patent: Mar. 27, 2012

(54) INFORMATION FEEDS OF A SOCIAL NETWORK

(75) Inventors: Donald A. Ramsay, Jr., Mercer Island, WA (US); Gary Caldwell, Redmond, WA (US); Ning Jiang, Bellevue, WA (US); Venkatesh Veeraraghavan, Seattle, WA (US); Gail Borod Giacobbe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 12/201,290

(22) Filed: Aug. 29, 2008

(65) Prior Publication Data

US 2010/0057682 A1 Mar. 4, 2010

(51) Int. Cl.
*G06F 17/30* (2006.01)
(52) U.S. Cl. ...................................... 707/802
(58) Field of Classification Search .......... 707/101, 707/781
See application file for complete search history.

(56) References Cited

U.S. PATENT DOCUMENTS

| | | | |
|---|---|---|---|
| 7,370,285 B1 | 5/2008 | Nickerson | 715/808 |
| 2005/0198021 A1 | 9/2005 | Wilcox | 707/3 |
| 2005/0234851 A1 | 10/2005 | King | 707/1 |
| 2005/0240623 A1 | 10/2005 | Kobza | 707/104.1 |
| 2006/0259957 A1* | 11/2006 | Tam et al. | 726/3 |
| 2006/0282304 A1* | 12/2006 | Bedard et al. | 705/10 |
| 2006/0284744 A1 | 12/2006 | Shotland | 341/50 |
| 2007/0100863 A1 | 5/2007 | Shardanand | 707/102 |
| 2007/0118801 A1* | 5/2007 | Harshbarger et al. | 715/730 |
| 2007/0233551 A1 | 10/2007 | Levy | 705/10 |
| 2008/0229215 A1* | 9/2008 | Baron et al. | 715/751 |
| 2008/0294663 A1* | 11/2008 | Heinley et al. | 707/100 |
| 2009/0094048 A1* | 4/2009 | Wallace et al. | 705/1 |
| 2010/0049534 A1* | 2/2010 | Whitnah et al. | 705/1 |

FOREIGN PATENT DOCUMENTS

| | | |
|---|---|---|
| EP | 1205859 A3 | 5/2002 |
| WO | WO2007135688 A2 | 11/2007 |
| WO | WO2008057635 A1 | 5/2008 |

OTHER PUBLICATIONS

Warwick Institute for Employment Research, "RSS News Feeds Available for the Site," Jul. 3, 2007, National Guidance Research Forum, http://www.guidance-research.org/about-ngrf/newsfeeds/.
Savin, Jake, "How to Add Comment Popup Windows to Your News Items Site," Feb. 18, 2003, Userland—ManilaNewbies, http://manilanewbies.userland.com/commentPopupsForNewsItems.
WebWorld, "How Can I Discuss and Comment The News Posted on The WebWorld?," Mar. 9, 2007, Communication and Information Support Center, http://www.unesco-ci.org/support/index.php?_m=knowledgebase&_a=viewarticle&kbarticleid=68.
Whitnah, Tom, "We're Open for Commentary," Jun. 25, 2008, The Facebook Blog http://blog.facebook.com/blog.php?post=20877767130.

* cited by examiner

*Primary Examiner* — Sheree Brown
(74) *Attorney, Agent, or Firm* — Merchant & Gould

(57) ABSTRACT

Various embodiments can be configured to provide a social networking computing environment. In an embodiment, a networked computing system can be used to provide informational feeds and commenting functionality to users of a social computing environment. In one embodiment, an enterprise-based social computing system can be configured to provide informational feeds to social networking application users. An informational feed can be populated with events and other information associated with one or more users of interest of an application user, but is not so limited. In one embodiment, a social computing environment can be configured to allow user commenting to feed items or events that are associated with a user or group of users.

20 Claims, 10 Drawing Sheets

Jan J. modified Lessons.one in http:// officelabs>projects>TownSquare>Documents at 10:45am (last commented at 10:51am)

Jed B. Posted (1) comment(s) at 2:20pm on Brian D.'d communicator note change to "Spending much of today (April 10) debugging project X"

INFORMATION FEEDS OF A SOCIAL NETWORK

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Computer networks and associated functionality have enabled the implementation of social networking computing environments. The Internet has provided a medium for users to publicly use a social networking application and share information with others. Some of the information may be available to anyone with access to the public social networking application. A user of a public social network may disseminate and receive information regarding other users in the form of a news or event feed. For example, a participant can upload a video, picture, or other data that can be included in an event feed for consumption by other users of the social network. In many public social networking applications, the population of an event feed is mostly due to proactive user activity. That is, a user has to proactively participate, and mutual collaboration may be required, to create a public social network, including maintaining an event feed with current information.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Various embodiments can be configured to provide a social networking computing environment. In an embodiment, a networked computing system can be used to provide informational feeds and commenting functionality to users of a social computing environment. In one embodiment, an enterprise-based social computing system can be configured to provide informational feeds to social networking application users. An informational feed can be populated with events and other information associated with one or more users of interest of an application user, but is not so limited. In one embodiment, a social computing environment can be configured to allow user commenting to feed items or events that are associated with a user or group of users.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
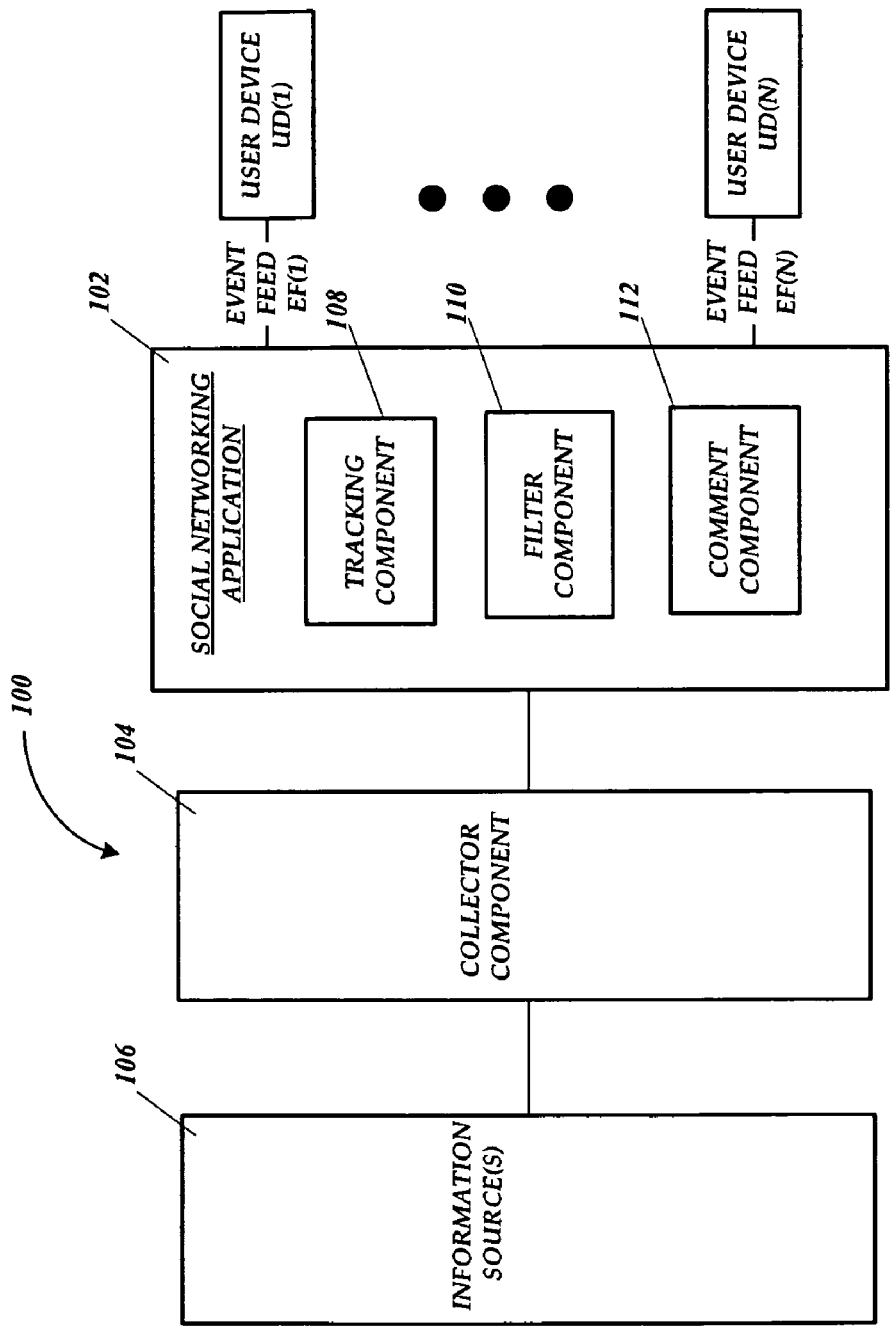
FIG. 1 is a diagram illustrating an exemplary networked computing system that includes social networking and other functionality.

Various embodiments can be configured to provide a social networking computing environment. In an embodiment, a networked computing system can be used to provide informational feeds and commenting functionality to users of a social computing environment. An informational feed can be populated with events and other information associated with one or more users of interest of an application user, but is not so limited. Components of the social computing environment can be configured to allow user commenting to feed items or events that are associated with a user or group of users. A comment can be associated with an event of an informational feed.

In one embodiment, an enterprise-based social computing system can be configured to provide event feeds to social networking application users. For example, an enterprise can configure components of an Intranet-based computing system to provide event or news feeds that include commenting features to users of the system. The system can include a social networking application which can be used by one or more enterprise users to view and interact with an event feed associated with one or more users of interest. For example, a tracking list can be used to track one or more users of interest to identify events for inclusion in a particular event feed. An event feed can include one or more comments made by one or more users of interest or some other user(s).

Components of the system can operate to generate an event feed based in part on a user of interest which is in contrast to a system that generates an information feed predominately based on content provided by application users. A user's social network can be expanded when a user who is not presently defined as a user of interest comments on an event of a user who is defined as a user of interest. Moreover, a user's social network can be expanded when a user who is presently defined as a user of interest comments on an event of a user who is not defined as a user of interest. A social networking application can be resident on a user device or web-based, and used to view and interact with person-centric information feeds due in part to the event feed being populated with events that are associated with one or more users of interest, but is not so limited. For example, an enterprise user having proper credentials can access a web-based social networking application to view events of an event feed using a computing device that is in communication with an Intranet-based computing network.

Events can be generated without the individual whose activity is described by the event having to proactively post event information. Correspondingly, components of the system can operate to provide an event feed to a targeted user based in part on one or more users who are associated with the targeted user. For example, an application user can selectively identify a number of users to watch or track, wherein events associated with the tracked users can be used to populate an event feed for the application user. As another example, a group of users may be automatically associated for tracking purposes based in part on a defined project, relationship, or other association within an enterprise. As an example, and in contrast to conventional social networking systems, a social network can be automatically created for a user based in part on the user's affiliation with others and/or an enterprise in general. For example, a system user may be offered a default network that is based on the user's communication history and/or organizational context.

In various embodiments, users of a social networking system can periodically update/view personal and other information associated with computer-based social network. A user can also decline to use a social networking system by opting-out and not participating in a social network. Application users of an enterprise-based social network can be made aware that using an enterprise-based social networking application will in some cases imply consent to the collection and posting of information in an event feed. Employees and other users can be informed that an employer may periodically monitor, supervise, collect, and publish personal and other information associated with network activity. A company handbook or other material can be used to provide information to a potential employee, current employee, or other user regarding the use and data provision capabilities of an enterprise-based social networking system, including personal and other information.

FIG. 1 is a diagram depicting components of an exemplary networked computing system 100. In an embodiment, components of the system 100 can be configured to provide a social networking environment to associated users, but is not so limited. As described below, components of the system 100 can be used to provide an event feed or stream that includes events and other information associated with users of the system 100. For example, components of the system 100 can be implemented as part of an enterprise-based Intranet environment, wherein enterprise users can view and interact with person-centric event feeds EF(1)-EF(N) delivered to associated user devices UD(1)-UD(N).

For example, a user can use a device, such as handheld computing/communication device, laptop, desktop, or other computing/communication device/system to interact with an interface of a social networking application 102 to view events and other information of an event feed associated with one or more users of interest. Moreover, a user can use an interface (see example interface of FIGS. 3A-3D) of the social networking application 102 to comment on one or more events of an event feed associated with a user of interest or some other user(s).

In an embodiment, as part of an informational hierarchy, a comment can be made to be subordinate to an event and/or comments cannot be made on comments (i.e., the comments are not threaded). In accordance with this embodiment, events or some transformation thereof, are included in an informational feed and comments can be accessed from an associated event. Moreover, a user can see all comments of an associated event. For example, a number of user comments can be provided for an event for a given day, regardless of the user who made an associated comment. In addition to displaying a system-generated event feed based in part on information collected from a number of back-end systems, an interface of the social networking application 102 can be configured to alert or inform an application user of a comment made by a user of interest and/or another user of the system. User comments can also be provided via email.

In one embodiment, user comments can be provided and/or published with events of an associated system-generated event feed, wherein the system-generated event feed can be automatically generated using a number of back-end systems as a result of users doing normal work within an organization. Moreover, an indicator or other alert can be used to inform an application user of a comment or comments associated with a system-generated event or events. For example, a user can view an event feed that includes an event that has an associated comment based on certain People and Event settings tailored to the end-user. As another example, a user can view a system-generated event feed that includes an event having an associated comment when someone comments on an event that the user would not normally see (e.g., the event is not associated with a designated user of interest). As yet another example, a user can view a system-generated event feed that includes an event that has an associated comment when another user comments on an event associated with the user.

Components of the networked system 100 can tailor and generate an event feed (e.g., one or more event feeds EF(1)-EF(N)) to a user device (e.g., one or more user devices UD(1)-UD(N)) based in part on one or more of an identity, relationship, and/or association of a particular user or group of users of a social network. For example, components of the system 100 can operate to generate an event feed that includes one or more user comments that can be viewed by an application user. In one embodiment, an event feed can be generated to include person-centric events, including one or more user comments and associated information that can be interleaved or interspersed with other events of the event feed. In another embodiment, events can be displayed in an informational feed, wherein information associated with one or more comments can be associated with the one or more events of the informational feed.

Person-centric can refer to the aspect of generating an event feed that is based in part on a user identity, such as a particular person of interest or an application user for example, rather than specific content. As described below, components of the system 100 can generate event feeds that can include events and comments associated with one or more users of interest with respect to a target application user. For example, a user can tailor an event feed by defining a social network to include certain users of interest. Correspondingly, each application user can receive an event feed that is unique and person-centric due in part to populating the information stream with events that are associated with one or more users of interest.

With continuing reference to FIG. 1, the system 100 includes a collector component 104 that can operate to collect or aggregate information from a plurality of systems, devices, and/or information resources, collectively referred to as information sources 106. For example, the collector component 104 that can operate to collect information from a number of back-end systems associated with an enterprise. In one embodiment, the framework of the collector component 104 can include a series of plug-ins, one for each back end system, that operates to retrieve events and other information from the information sources 106 (e.g., SHAREPOINT, COMMUNICATOR, OUTLOOK, ACTIVE DIRECTORY, and/or other information technology (IT) systems).

As described above, the collected information can be used to generate an event feed for an application user based in part on one or more users of interest. In one embodiment, the social networking application 102 can include a tracking component 108 that can operate to track one or more identified users of interest. For example, an application user can add another user as a user of interest, wherein the user of interest information can be used by the tracking component 108 to identify one or more users of interest as part of generating events of an associated event feed. As one example, a directory structure and associated computing resources can be used to manage and maintain data that tracks certain enterprise users as persons of interest. The social networking application 102 also includes a filter component 110. The filter component 110 can be used to filter the collected information based in part on an identity of the application user, one or more of the users of interest, and/or others when generating an event feed for the application user.

As shown in FIG. 1, and according to an embodiment, the social networking application 102 can be configured with a comment component 112. The comment component 112 can be used by an application user to comment on one or more events of an event feed. Comments can also by collected by the collector component 104 when collecting information for an event feed. For example, the filter component 110 can operate to filter comments for inclusion in a particular event feed based in part on the identity of an application user, commenting user, and/or one or more of the users of interest. In one embodiment, a user comment can be included as an event in an event feed of a user of interest who is associated with a commenting user. Correspondingly, a user comment can be added as an event to an event feed. In some instances, comments can be stored in a dedicated system or central repository for further collection, filtering, and/or dissemination.

As in the example described above, an enterprise user's social network can be defined to include one or more users of interest, including one or more commenting users associated with a user of interest. As an example, an application user's social network can be defined by default and/or modified upon becoming associated with the enterprise. An application user's social network can also be custom built and further refined by the application user or another enterprise user or affiliate. Moreover, a user's social network can be automatically expanded when another user who is not currently defined as a user of interest makes a comment to an event associated with a defined user of interest. Accordingly, components of the system 100 can operate to generate an event feed that is populated with events that are associated with users of a particular social network.

As an example, components of FIG. 1 can be implemented to provide an enterprise-based social network to enterprise users associated with a corporation or other organization (e.g., users using user devices UD(1)-UD(N)). An enterprise-based computing system can include an Intranet-based architecture that can be protected from all or a portion of a public network (e.g., the Internet) by using trust or other barrier(s), such as one or more firewalls and other protective measures. Enterprise users (e.g., employees and/or other trusted users) are associated with the enterprise and engage in enterprise activities. Components of the system 100 can operate to collect and filter information (e.g., user events) associated with one or more enterprise users including information associated with a task, announcement assignment, a comment, and/or other operation within the enterprise. For example, information associated with an employee promotion, an employee anniversary, employee comment, a completed project or milestone, posted information, etc. can be collected from one or more back-end systems and used in part to generate one or more events for one or more event feeds.

The social networking application 102 can be used by an enterprise user to view and interact with an event feed that includes events associated with one or more users of interest. The social networking application 102 can be configured as a web-based application or as an application program residing on a user's computing device. As described above, the social networking application 102 can operate to provide an event feed to an associated user. The social networking application 102 may be described as being somewhat asymmetric based in part on the nature of collecting information from enterprise users and providing of filtered information to application users.

Information for an event feed can be collected from one or more back-end or other systems without a user having to proactively supply information using the social networking application 102. The information can be associated with one or more of the application users, tracking users, and/or some other user(s). For example, an application user can also be a user of interest for another application user. Certain users can also be added to a social network within the enterprise based in part on a user comment. The social networking application 102 can be used to generate an event feed for the application or tracking user based in part on an identity of the tracking user and/or one or more users of interest.

An event feed can include events associated with a topic, user of interest, application user, or some other enterprise aspect. Such events might include anything that a participant might find interesting. Example events may include that a tracked user: added a new picture to a profile; made a blog or travel entry; stepped out for a meeting and returns at some designated time; has a birthday on such and such data; received a promotion; finished a task; commented on an event; etc. Upon joining an enterprise, an application user can register with a social networking system and receive a tailored event feed associated with one or more users of interest, but is not so limited. Components of the system 100 can track and maintain users of interest for an associated application user. In one embodiment, for each application user, the components of the system 100 can operate to categorize one or more users of interest into group-based categories, where the event types for each group can differ depending in part on the particular group and/or group members.

In certain embodiments, other users (e.g., trusted users), who may not be part of the enterprise, are allowed to use aspects of the system 100, including interacting within a social network. The information regarding a user of interest may be richer if the user of interest is a member of the enterprise and engages in enterprise processes. However, when users, internal and external to the enterprise, are within a common sphere of trust, the conveyance of information regarding activities engaged in within that sphere of trust may be much richer and shared with greater confidence. Correspondingly, the social networking application 102 can serve as an information broker that provides a centralized point where application users can obtain information regarding other users associated with an enterprise.

Figure 2:
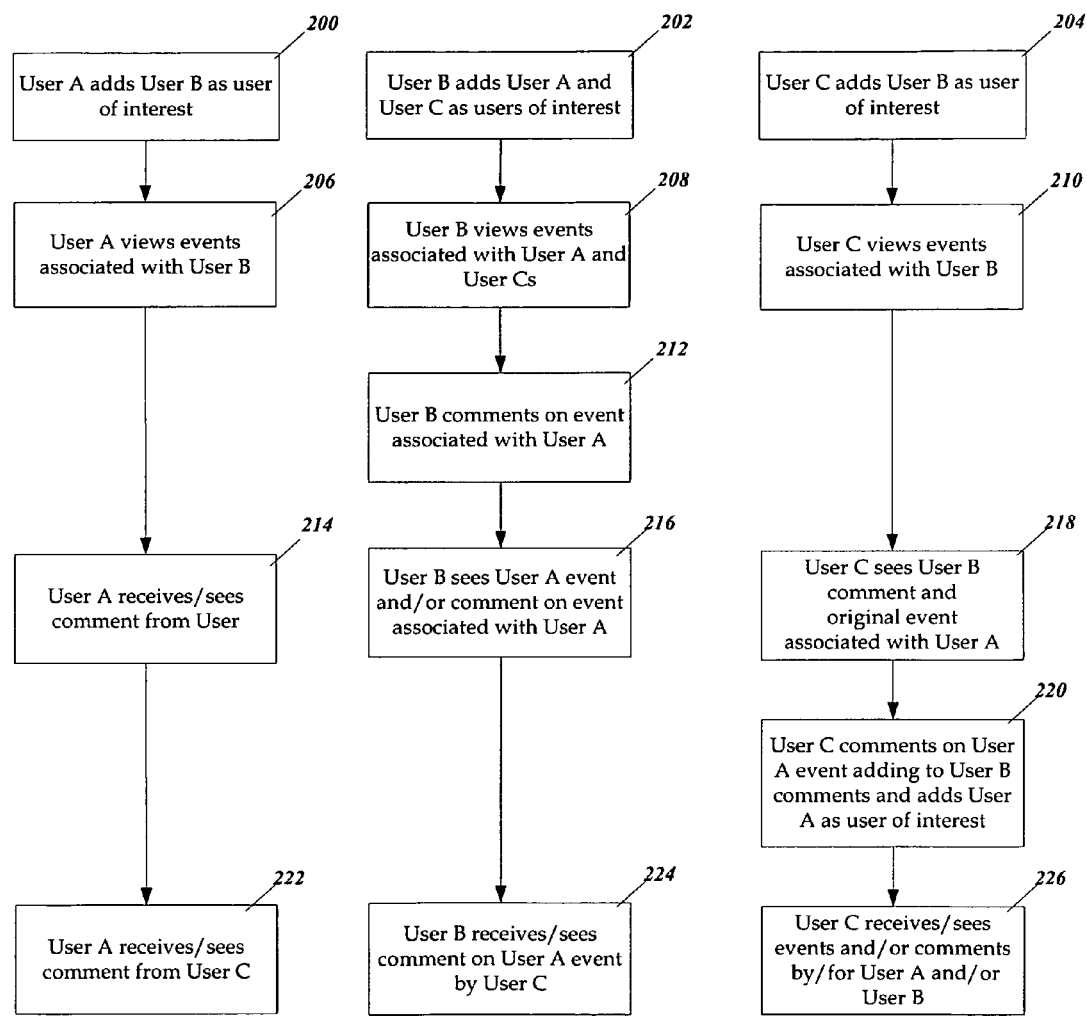
FIG. 2 is a flow diagram illustrating an exemplary process of providing an event feed to an application user.

FIG. 2 is a flow diagram illustrating an exemplary process of providing an event feed to an application user. For example, the process can be used to provide an event feed that can include one or more user comments to a user of a social networking application. The operations shown in FIG. 2 can occur simultaneously, substantially simultaneously, or some other time relation. At 200, User A adds user B as a user of interest. For example, User A can use an interface of a social networking application to identify User B as a user of interest by adding User B to User A's tracking list. The tracking list can include users of interest to use when generating events of an event feed for a particular application user.

At 202, User B adds user A and User C as users of interest. For example, User B can use an interface of a social networking application to identify Users A and C as users of interest by adding Users A and C to User B's tracking list. At 204, User C adds user B as a user of interest. For example, User C can use an interface of a social networking application to identify User B as a user of interest by adding User B to User C's tracking list. While a number of users are described in FIG. 2, other numbers of users can be included.

At 206, User A uses the interface of the social networking application to view events associated with User B since User B has been defined as a user of interest for User A. For example, the filter component 110 of FIG. 1 can be used to filter events associated with User B included in the collected information from the collector component 104 as part of providing the event feed to User A. At 208, User B uses the interface of the social networking application to view events associated with Users A and C since Users A and C have been defined as a users of interest for User B. At 210, User C uses the interface of the social networking application to view events associated with User B since User B has been defined as a user of interest for User C.

At 212, User B uses a commenting interface of the social networking application to comment on an event associated with User A. For example, a comment window (see FIG. 3D) can be used by the application user to comment on an event of an event feed. At 214, User A receives and/or sees the comment associated with User A's event which was provided by User B. User A receives and/or sees User B's comment since the comment is associated with User A and User B has been defined as a user of interest for User A. For example, User A can receive an email or view a comment indicator which informs User A of User B's comment. As described above, User B's comment can also be added as an event to be included in User A's event feed.

At 216, User B sees the event associated with User A along with User B's comment in User B's event feed. At 218, User C sees User B comment and the original event associated with User A that was commented on by User B in User C's event feed. User C sees the event associated with User A even though User A has not been designated as a user of interest for User C since User B has made a comment and User B has been designated as a user of interest of User C. In one embodiment, a user can automatically be associated with another user as a user of interest when a current user of interest makes a comment to an event associated with a targeted user. For example, User A can automatically be added to User C's tracking list and/or User C can automatically be added to User A's tracking list when User B comments on an event associated with User A since User A and User C have been previously designated as users of interest for User B.

At 220, User C uses a commenting interface of the social networking application to comment on the original event associated with User A and/or User B's comment. In one embodiment, before making a comment, User C can also add User A as a user of interest. In another embodiment, User A can be automatically added to a tracking list as a user of interest for User C, based in part on the user of interest association of User A in relation to User B, and/or User B in relation to User C. For example, User C can add User A to the tracking list upon seeing the original event and/or User B comment associated with User A.

At 222, User A receives and/or sees User C's comment since the comment is directed to an event associated with User A. Moreover, User A receives and/or sees User C's comment due in part to the fact that the comment is based on a comment made by User B to the original event associated with User A and User B has been defined as a user of interest for User A. For example, User A can receive an email and/or view a comment indicator which informs User A of User C's comment. User C's comment can also be added as an event to be included in User A's event feed. Accordingly, User A's social network can now be expanded to include User C as a user of interest and can be used to provide events associated with User C in User A's event feed.

At 224, User B receives and/or sees User C's comment. User B receives and/or sees User C's comment since User B is a user of interest for User C. User C's comment is also based on a comment made by User B to the original event associated with User A and/or User B has been defined as a user of interest for User C. Thereafter, at 226, User C receives and/or sees comments provided by User A and/or User B, since User A and User B are included as users of interest for User C. For example, events, including comments, associated with User A and/or User B can be included in User C's event feed. User C can also receive and/or see comments and/or events associated with other commenting users who make comments to events associated with one or more of User C's users of interest. Other combinations and permutations of operations can be included, as well as an order and number of operations and associated users. For example, operations can be selectively added, removed, rearranged, etc. according to a desired implementation. Accordingly, other embodiments are available.

Figure 3A:
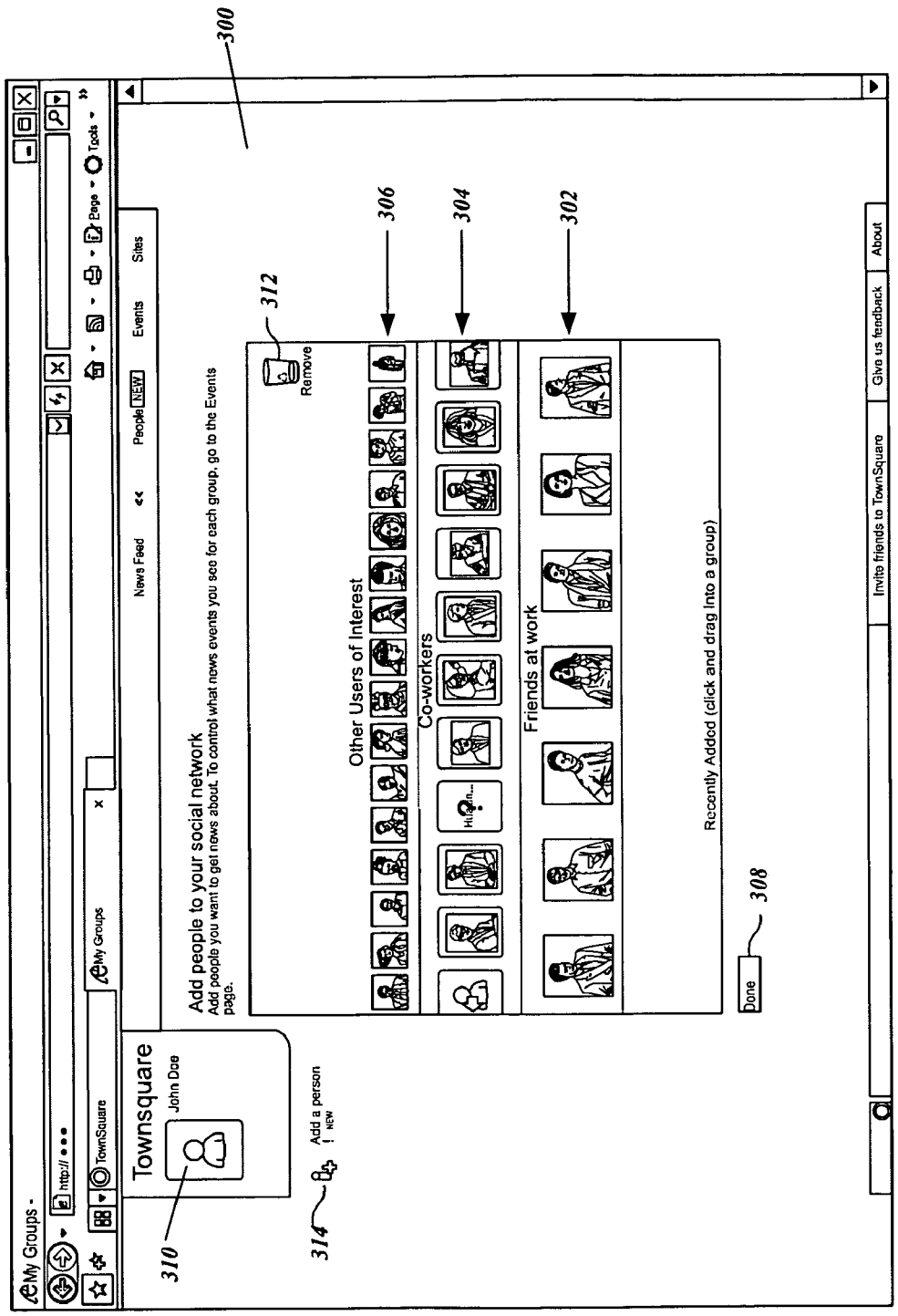
FIGS. 3A-3D depict aspects of an exemplary user interface associated with a social networking application.

FIGS. 3A-3D depict aspects of an exemplary user interface (shown generally by 300) associated with a social networking application. While certain aspects of the exemplary user interface are shown and described, other implementations and embodiments are available. As shown in FIG. 3A, a user is currently viewing aspects of a social network that include how an application user can view and edit associated group memberships.

The exemplary user interface 300 depicts pictures or other representations that represent users of interest who are categorized by group. In this example, the groups are Friends at Work, Co-workers, and Other Users of Interest. The pictures or other representations of Friends at Work are depicted in section 302 of the user interface 300. The pictures of Coworkers are depicted in section 304 of the user interface 300. The pictures of Other People of Interest are depicted in section 306 of the user interface 300. Aspects of the user interface 300 can be tailored to differentiate one group from another. For example, font and icon sizes can be varied to distinguish one group from another, emphasize an estimation of an importance factor for an event feed associated with a user of interest or for some group.

In order to change a user of interest from one group to another, the picture or other representation for that individual may simply be dragged and dropped into another group. Upon selection of the "Done" control 308, a user relations management component can be updated, causing a change to characteristics of an event feed provided to the application user 310. The remove control 312 may be used to remove a user of interest from a group. A picture of a topic individual can be dragged and dropped onto the remove control 312. The application user 310 can use the "add a person control" 314 to select an individual from a group of available individuals. The application user 310 can also use the add a person control 314 to view suggested additions to one or more of the groups.

Figure 3B:
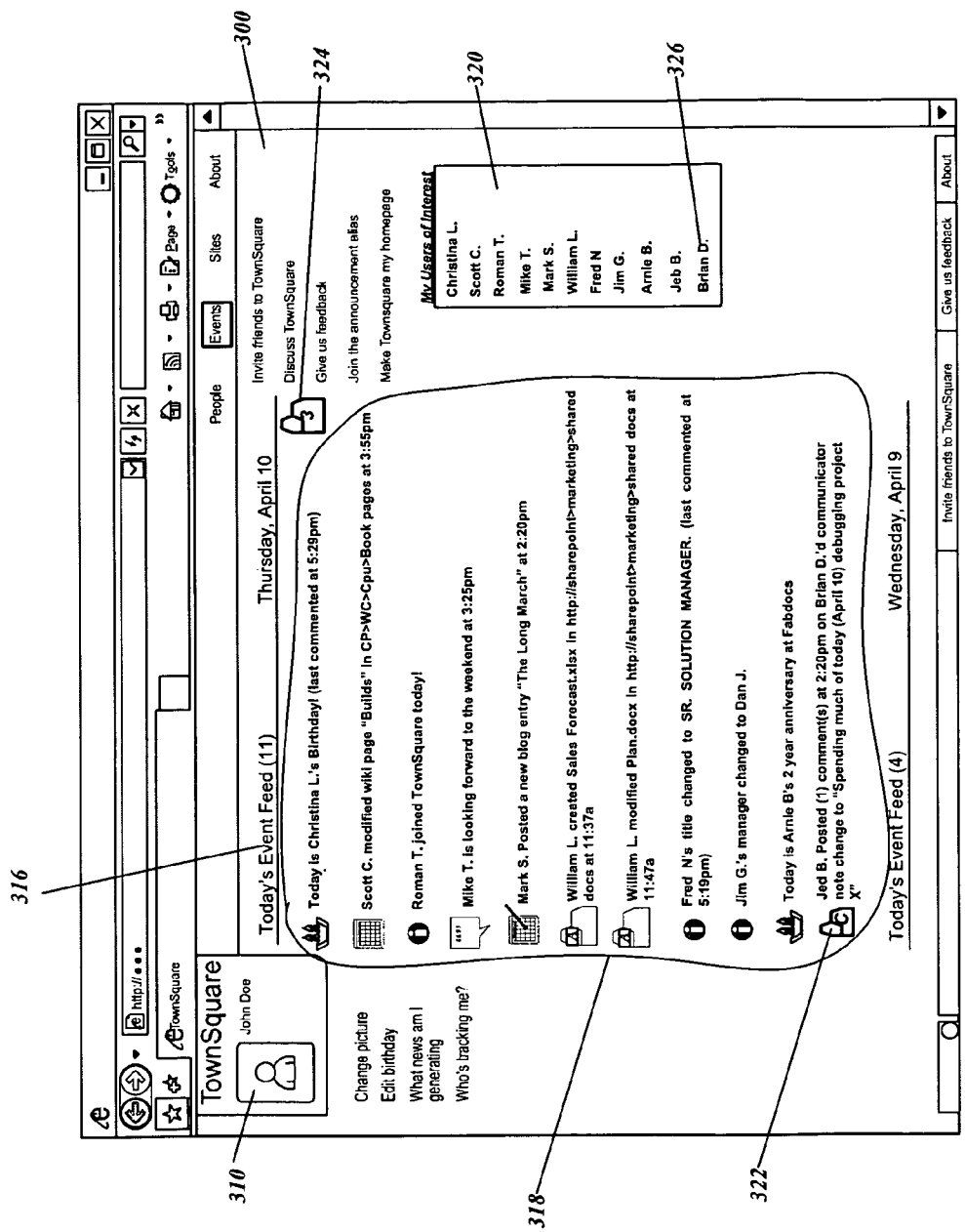

FIG. 3B depicts further aspects of the exemplary user interface 300 of the social networking application. As shown in FIG. 3B, an event feed 316 is being provided to the application user 310. The event feed 316 includes a number of events (collectively referred to as 318) associated with one or more users of interest (collectively referred to as 320) of the application user 310. One of the events 322 corresponds to a comment made by one of the users of interest 320. A comment indicator 324 of the interface 300 indicates that the user 310 has three comments. A new user 326 of interest has been added to the users of interest 320 based in part on the comment made to an event associated with one of the application user's user of interest.

Figure 3C:
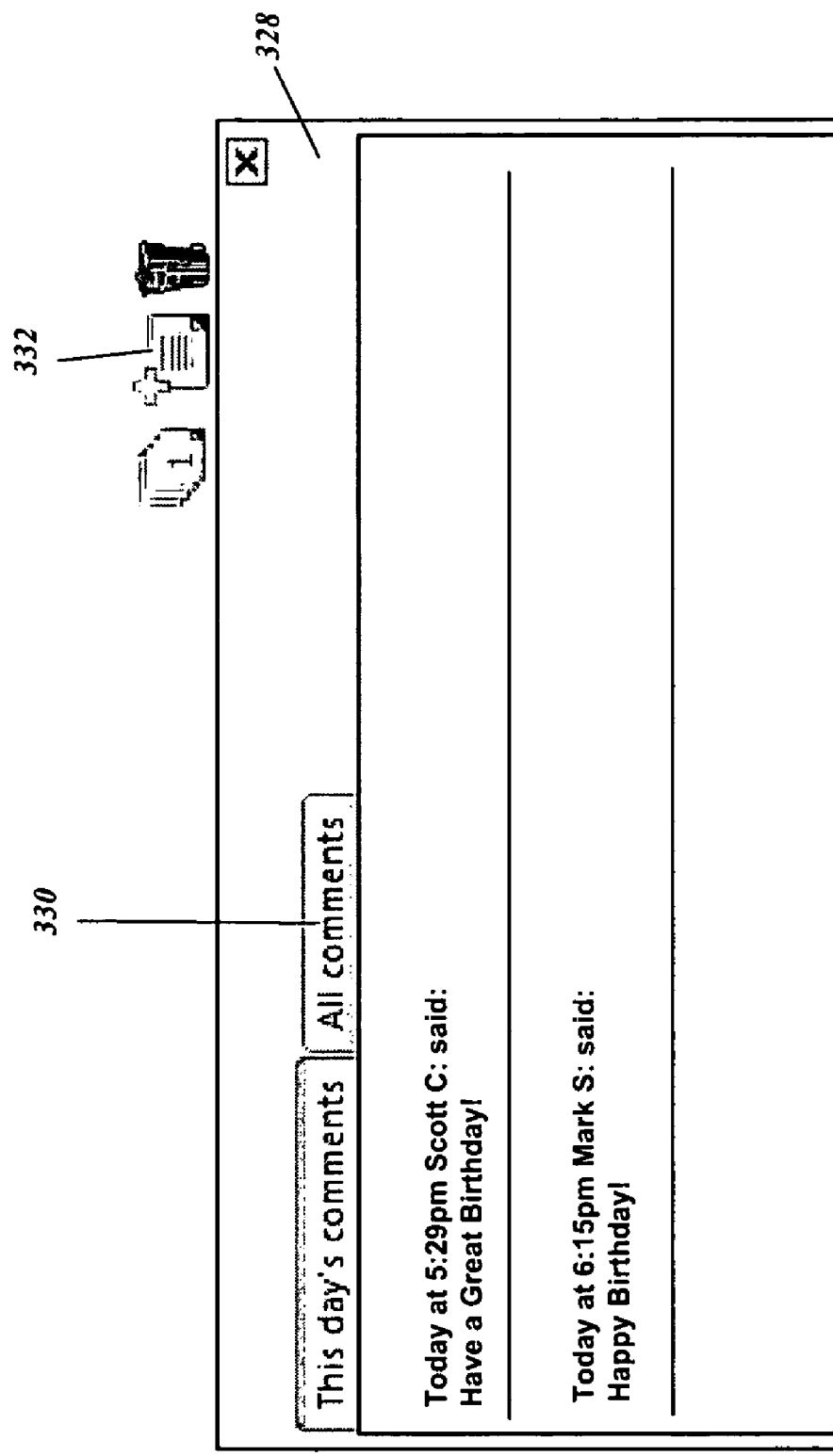

FIG. 3C depicts an exemplary comment interface 328 of the exemplary user interface 300. The exemplary interface 328 can be opened when a user clicks on the comment indicator. As shown, the user 310 has selected a tab to view comments associated with a particular day. The interface 328 also includes a tab 330 that can be used to view all user comments associated with user 310. The interface 328 includes a selection interface 332 that the user 310 can use to create and post a comment.

Figure 3D:
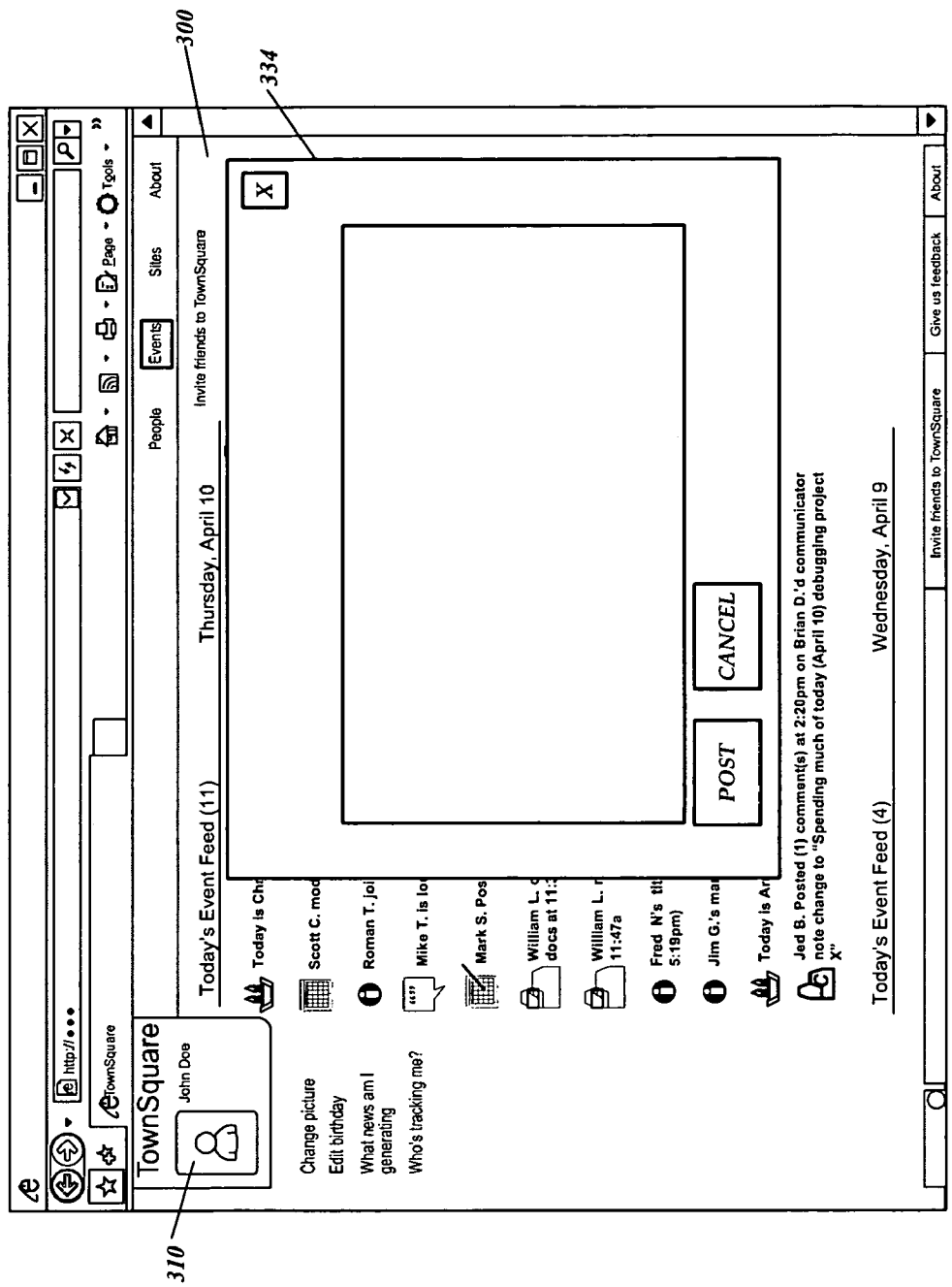

FIG. 3D depicts a comment creation interface 334 that the user 310 can use to create and post a comment. For example, the user 316 can click on the selection interface 332 which operates to open the comment creation interface 334, which allows the user 316 to create and post comment.

As described briefly above, comments can be made to events associated with one or more users of interest. For example, comments can be related to an announcement event that is published in a user's event feed. In one embodiment, a commenting user can be added to a user of interest tracking list if the comment is for an event associated with a user of interest currently included in the tracking list. The addition of comments can complicate the presentation of an event feed due in part to the association (or disassociation) of a commenting user and the time and date that a comment is posted or added.

As an example, consider the following scenario:
1) Person A has only person B in their co-workers group.
2) Person C has only person A in their friends group.
3) Person B has a Birthday event.
4) Person A see person B's birthday event in an associated event feed and makes a comment on the person B's event.
5) Person C would not normally see person's B birthday event since person B is not currently designated as a user of interest for person C. However, since person C is watching or tracking person A, person C sees person A's comment along with person B's original event.

Accordingly, person C's personal social network can be expanded to include person B. Moreover, person C's event feed can now be populated include events associated with person B. That is, an application user's social network can be expanded by seeing people and events that others find interesting as well. While one example is illustrated above, other example scenarios can include other variations. For example, an event can be published associated with person B creating a new blog within the enterprise, etc.

In one embodiment, an application user will see a comment under one or more of the following circumstances:
1) if the application user saw the original event associated with the comment.
2) if the comment is directed to an event that is associated with the application user.
3) if a user of interest (e.g., on a tracking list of the application user) makes a comment (along with the original event (this feature can be disabled)).

Figure 4A:
FIGS. 4A-4B depict aspects of an exemplary presentation format of an event feed.
Figure 4B:

Another aspect of commenting in a social network includes when a comment occurs. Since comments can be made on subsequent days from an original event, more than one view can be included for an associated event feed. For example, if a comment happened on the same day as the event an icon or other identifier can be displayed with the event to inform the application user of the number of comments (see the event text of FIG. 4A). However, if a comment happens on a different day, the application can operate to change the wording of the event to highlight the associated comment (see the event text of FIG. 4B).

Another aspect of commenting in a social network includes the creation and communication of email alerts to application users when a comment is made. For example, a user may only be emailed a limited number of times (e.g., once) within a given time period (e.g., one day) to prevent email overloading. In one embodiment, an email is created and communicated for a first comment made to an event for a particular day. The email feature can be used to determine if a user would be accepting of receiving email alerts associated with received comments. As one result, additional users can be drawn into a social network.

Figure 5:
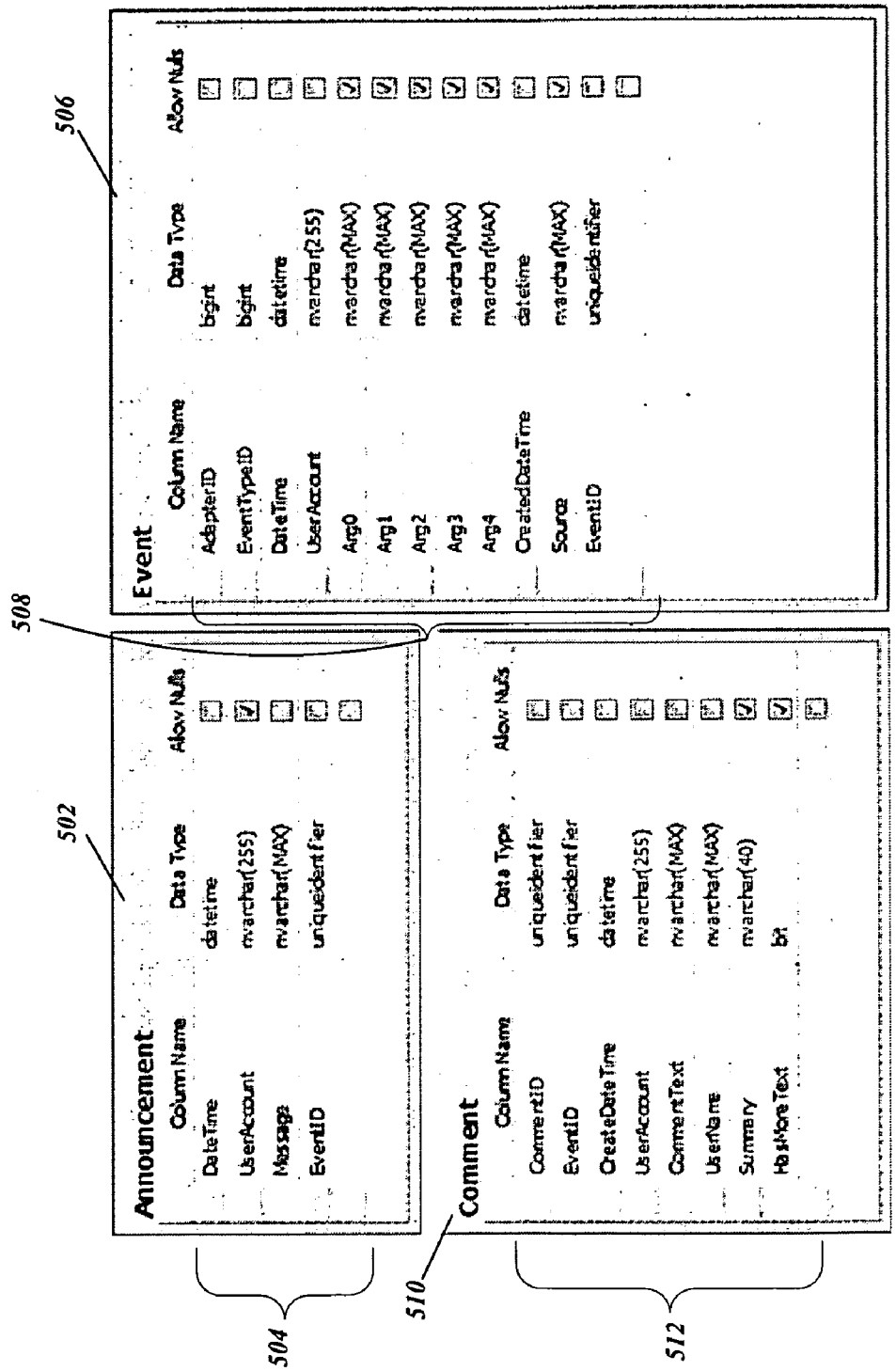
FIG. 5 depicts aspects of an exemplary schema.

FIG. 5 depicts aspects of an exemplary schema that can be used as providing a social networking environment to users of a social computing network. As shown in FIG. 5, and according to an embodiment, the exemplary schema 500 can include an announcement schema 502 having a number of announcement attributes 504. The exemplary schema 500 can also include an event schema 506 having a number of event attributes 508. The exemplary schema 500 can further include a comment schema 510 having a number of comment attributes 512. A user can check or select one or more attributes according to a desired implementation of the social networking application. In various embodiments, the event schema 508 can be configured to include one or more of the announcement schema 502 and/or the comment schema 510 and/or one or more associated attributes and/or values.

The following description corresponds to aspects of an exemplary social networking application that includes functionality to provide an event feed to users of a social computing network. For example, features of the schema of FIG. 5 can be used to tailor and provide one or more event feeds, including one or more user comments, to associated computing users of a social computing network. The following description can be used to provide commenting functionality for implementation in a social computing network, such as an enterprise-based computing network for example. In one embodiment, a user's social network can be enlarged by including commenting users and/or potential users of interest associated with a comment.

The description below describes an exemplary main stored procedure that can be used to retrieve comments and events based one or more generation rules. For example, attributes of the schema of FIG. 5 can be selectively used to retrieve comments and events from a collection of information as part of providing an event feed to an application user.

```
CREATE PROCEDURE [dbo].[spGetFilteredEventsCom-
mentsForDateRange]
   @samaccountname nvarchar(50),
   @datebegin datetime,
   @dateend datetime,
   @localtimeOffset int
AS
BEGIN
   -- SET NOCOUNT ON added to prevent extra result sets from
   -- interfering with SELECT statements.
   SET NOCOUNT ON;
   Declare @EventComment Table(
      EventTypeID bigint,
      EventID uniqueidentifier,
      Date DateTime,
      UserAccount nvarchar(255),
      Arg0 nvarchar(max),
      Arg1 nvarchar(max),
      Arg2 nvarchar(max),
```

```
Arg3 nvarchar(max),
Arg4 nvarchar(max),
CommentCount bigint,
CommentID uniqueidentifier,
CommentDateTime DateTime,
CommenterAlias nvarchar(255),
CommenterName nvarchar(max),
CommentSummary nvarchar(40),
HasMoreText bit,
SortDate DateTime);
--
-- Grab the events for this date range and a comment count for all time
--
WITH MyFilteredEvents AS
(
-- Announcements
SELECT DISTINCT
14 As [EventTypeID]
,[EventID]
,DATEADD(hour, @localtimeOffset, [DateTime]) As [Date]
,@samaccountname As [UserAccount]
,Message as [Arg0]
,NULL as [Arg1]
,NULL as [Arg2]
,NULL as [Arg3]
,NULL as [Arg4]
FROM [Announcement] (nolock)
WHERE (useraccount IS NULL OR useraccount = @samaccountname)
AND [DateTime] BETWEEN @datebegin AND @dateend
UNION
--Events for the people you are watching
SELECT DISTINCT
[Event].[EventTypeID] as [EventTypeID]
,[EventID]
,DATEADD(hour, @localtimeOffset, [DateTime]) As [Date]
,[UserAccount]
,[Arg0]
,[Arg1]
,[Arg2]
,[Arg3]
,[Arg4]
FROM [event] (nolock)
join WatchedUsersWithFilter (nolock) as WatchedView
on WatchedView.UserAlias = @samaccountname
and WatchedView.WatchedUser = [Event].[UserAccount]
and WatchedView.EventTypeID = [Event].[EventTypeID]
AND [DateTime] BETWEEN @datebegin AND @dateend
)
insert @EventComment
SELECT [EventTypeID]
, [MyFilteredEvents].[EventID] as [EventID]
, MAX([Date]) As [Date]
, [MyFilteredEvents].[UserAccount] as [UserAccount]
, [Arg0]
, [Arg1]
, [Arg2]
, [Arg3]
, [Arg4]
, Count(CommentID) as [CommentCount]
,NULL as [CommentID]
,NULL AS [CommentDateTime]
,NULL AS [CommenterAlias]
,NULL AS [CommenterName]
,NULL AS [CommentSummary]
,NULL AS [HasMoreText]
,ISNULL(DATEADD(hour, @localtimeOffset, MAX([CreateDateTime])), MAX([Date])) as [SortDate]
FROM MyFilteredEvents
LEFT OUTER JOIN [Comment] (nolock)
ON MyFilteredEvents.EventID = Comment.EventID
GROUP BY [EventTypeID], [MyFilteredEvents].[EventID], [MyFilteredEvents].[UserAccount], [Arg0], [Arg1], [Arg2], [Arg3], [Arg4]
--
-- Now add just comments from buddies
--
insert @EventComment
SELECT [EventTypeID]
,convert(uniqueidentifier, MAX(convert(binary(16), [Event].[EventID]))) as [EventID]
,MAX(DATEADD(hour, @localtimeOffset, [DateTime])) As [Date]
, [Event].[UserAccount] as [UserAccount]
, [Arg0]
, [Arg1]
, [Arg2]
, [Arg3]
, [Arg4]
, 1 as [CommentCount]
,CommentID
,DATEADD(hour, @localtimeOffset, CreateDateTime) AS [CommentDateTime]
,Comment.UserAccount AS [CommenterAlias]
,Comment.UserName AS [CommenterName]
,Comment.Summary AS [CommentSummary]
,Comment.HasMoreText
,ISNULL(DATEADD(hour, @localtimeOffset, CreateDateTime), MAX(DATEADD(hour, @localtimeOffset, [DateTime]))) as [SortDate]
FROM Comment (nolock)
JOIN [Event] (nolock)
ON Event.EventID = Comment.EventID
And Event.EventID NOT IN (SELECT EventID FROM @EventComment)
WHERE
[Comment].[CreateDateTime] BETWEEN @datebegin AND @dateend
AND
-- comment for me
(Event.UserAccount = @samaccountname
-- commenter is my buddy
OR [Comment].[UserAccount] in
(
SELECT DISTINCT WatchedUser from WatchedUsersWithFilter (nolock) as WatchedView
WHERE WatchedView.UserAlias = @samaccountname
and WatchedView.EventTypeID = 100
)
-- comment on my buddy's event
OR ( EXISTS
(SELECT TOP 1 WatchedUser from WatchedUsersWithFilter (nolock) as WatchedView
WHERE WatchedView.UserAlias = @samaccountname
and WatchedView.WatchedUser = [Event].[UserAccount]
and WatchedView.EventTypeID = [Event].[EventTypeID]
)
AND
[Event].[UserAccount] in
(
SELECT DISTINCT WatchedUser from WatchedUsersWithFilter (nolock) as WatchedView
WHERE WatchedView.UserAlias = @samaccountname
and WatchedView.EventTypeID = 101
)
)
)
GROUP BY [EventTypeID], [Event].[UserAccount], [Arg0], [Arg1], [Arg2], [Arg3], [Arg4]
,CommentID
,DATEADD(hour, @localtimeOffset, CreateDateTime)
,Comment.UserAccount
,Comment.UserName
,Comment.Summary
,Comment.HasMoreText
--
-- Now just return the data, grouped properly to aggregate different event ids that refer to the same event
--
SELECT EC.EventTypeID
, convert(uniqueidentifier, MAX(convert(binary(16), [EventID]))) as [EventID]
, MAX([Date]) As [Date]
, [UserAccount]
, [Arg0]
, [Arg1]
, [Arg2]
, [Arg3]
, [Arg4]
, Sum(CommentCount) as [CommentCount]
,[CommentID]
,[CommentDateTime]
,[CommenterAlias]
,[CommenterName]
,[CommentSummary]
```

-continued

```
,[HasMoreText]
,MAX([SortDate]) as [SortDate]
FROM @EventComment as EC
JOIN UserAllowedEvents
on UserAllowedEvents.EventTypeID = EC.EventTypeID
and UserAllowedEvents.UserAlias = EC.UserAccount
JOIN UserAllowedDate
on UserAllowedDate.UserAlias = EC.UserAccount
and UserAllowedDate.ActiveDate <= GETUTCDATE( )
GROUP BY EC.EventTypeID, [UserAccount], [Arg0], [Arg1],
[Arg2], [Arg3], [Arg4]
,[CommentID]
,[CommentDateTime]
,[CommenterAlias]
,[CommenterName]
,[CommentSummary]
,[HasMoreText]
ORDER BY [SortDate] DESC
END
```

The description below describes exemplary instructions that can be used to provide a serializable form of a comment. Serializeable can be defined as an attribute of an object class. For example, members of a certain object class can be serialized into well defined strings of bits (e.g., for storing and transmitting) and deserialized for reconstructing the information in memory.

```
/// <summary>
/// Serializeable form of a Comment
/// </summary>
[Serializable]
public class NewsfeedComment
{
  string _commenterAlias;
  string _commenterName;
  DateTime _commentDateTime;
  string _commentText = String.Empty;
  string _commentGuid = String.Empty;
  bool _hasMoreText = false;
   /// <summary>
   /// Unique id of a comment
   /// </summary>
   public string CommentGuid
   {
     get { return _commentGuid; }
     set { _commentGuid = value; }
   }
   /// <summary>
   /// user making the comment
   /// </summary>
   public string CommenterAlias
   {
     get { return _commenterAlias; }
   }
   /// <summary>
   /// Display name of the commenter
   /// </summary>
   public string CommenterName
   {
     get { return _commenterName; }
   }
   /// <summary>
   /// Date and time the comment was made
   /// </summary>
   public DateTime CommentDateTime
   {
     get { return _commentDateTime; }
   }
   /// <summary>
   /// Comment text, generally just a summary
   /// </summary>
   public string CommentText
   {
     get { return _commentText; }
     set { _commentText = value; }
   }
   /// <summary>
   /// If a longer version of the comment is available
   /// </summary>
   public bool HasMoreText
   {
     get { return _hasMoreText; }
     set { _hasMoreText = value; }
   }
   /// <summary>
   /// Construct a newsfeed comment
   /// </summary>
   /// <param name="cid">Unique id</param>
   /// <param name="alias">commenter's alias</param>
   /// <param name="name">commenter's display name</param>
   /// <param name="cdate">Date the comment was made</param>
   /// <param name="text">Summary of the comment</param>
   /// <param name="moretext">True if more text than the summary is available</param>
   public NewsfeedComment(string cid, string alias, string name, DateTime cdate, string text, bool moretext)
   {
     _commentGuid = cid;
     _commenterAlias = alias;
     _commenterName = name;
     _commentDateTime = cdate;
     _commentText = text;
     _hasMoreText = moretext;
   }
}
```

The description below describes exemplary instructions that can be used to compress comments by associated events and/or users of interest when the comment and associated event occur on different days or within a defined amount of time. Compression techniques can be used to reduce an the amount of screen real estate required to present items that can be grouped together. For example, multiple comments on the same event can be shown at the highest level as an icon with the number of comments, where the user can click on the icon to see the detailed comment text and/or each comment. In one embodiment, the time zone of the user who is viewing a feed is used to present comments and other feed information.

```
      private    void    CompressComments(People    me,
EventData    ev, Tokenizer.ContextTypes context)
      {
        if (ev.CommentCount > 0 && ev.Comments.Count > 0)
        {
          string msgtemplate = "{0} posted {1} comment(s){4} on {3}'s {2}";
          string[ ] fields = new string[5];
          int bptr;
          bool myself;
          string[ ] users = GetCommenterNames(me, ev, context, out bptr, out myself);
          string namestring = String.Empty;
          if (bptr == 0)
          {
            namestring = "Someone you are not tracking";
          }
          else
          {
            namestring = users[0];
            if (users.Length > 1)
            {
              namestring += " and others";
            }
          }
```

```
            fields[0] = namestring;
            fields[1] =
ev.Comments.Count.ToString(CultureInfo.InvariantCulture);
            if (String.IsNullOrEmpty(ev.EventDescForComment))
            {
                ev.EventDescForComment =
GenerateEventStringForComment(ev, context);
            }
            Comment latestComment = ev.Comments[0] as Comment;
            ev.DateTime = latestComment.CommentDateTime;
            fields[2] = ev.EventDescForComment;
            fields[3] = ev.EventArgs[0];
            if (String.IsNullOrEmpty(ev.Alias))
            {
                ds[3] = "Townsquare";
            }
            fields[4] =
            GenerateEventDateTimeString(ev.DateTime, true);
            ev.Message = _token.ExpandTokenizedString(null,
String.Format(CultureInfo.InvariantCulture, msgtemplate, fields), context);
            ev.IconLocation = "Images/commentico.gif";
            ev.EventTypeId = ev.CommentId;
            ev.IsComment = true;
            ev.compressedEventIDs = new string[1];
            ev.compressedEventIDs[0] = ev.Guid;
            GenerateMoreInfoForComment(ev, true);
        }
    }
```

The description below describes exemplary instructions that can be as a web service to add a comment based in part on an event associated with a user of interest.

```
                              [WebMethod]
        public void AddComment(string evuser, string usertoken, string eventIDstr,
string commentText, bool withEmail, int toffset)
        {
            string alias = Utilities.GetCurrentAccount(this);
            bool canEmail = false;
            SqlDataReader rdr = null;
            using    (SqlConnection    conn    =    new
SqlConnection(WebConfigurationManager.AppSettings["TownsquareDB"]))
            {
                conn.Open( );
                Guid commentID = System.Guid.NewGuid( );
                Guid eventID = new Guid(eventIDstr);
                DateTime now = DateTime.Now.ToUniversalTime( );
                commentText = HttpUtility.HtmlEncode(commentText);
                SqlCommand cmd = new SqlCommand("spAddComment", conn);
                try
                {
                    bool moretext = false;
                    string showtext = commentText;
                    if (commentText.Length > 30)
                    {
                        int    space    =    commentText.LastIndexOf("   ",    29,
StringComparison.OrdinalIgnoreCase);
                        moretext = true;
                        showtext = commentText.Substring(0, 30);
                        if (space > 0 && space < 30)
                        {
                            showtext = commentText.Substring(0, space);
                        }
                    }
                    cmd.CommandType = CommandType.StoredProcedure;
                    cmd.Parameters.AddWithValue("@eventuser", evuser);
                    cmd.Parameters.AddWithValue("@commentid", commentID);
                    cmd.Parameters.AddWithValue("@eventid", eventID);
                    cmd.Parameters.AddWithValue("@useralias", alias);
                    cmd.Parameters.AddWithValue("@username", usertoken);
                    cmd.Parameters.AddWithValue("@datetimeadded", now);
                    cmd.Parameters.AddWithValue("@commenttext", commentText);
                    cmd.Parameters.AddWithValue("@commentsum", showtext);
                    cmd.Parameters.AddWithValue("@hasmoretext", moretext);
                    rdr = cmd.ExecuteReader( );
                    while (rdr.Read( ))
                    {
                        if (!(rdr["CanEmail"] is DBNull))
                        {
                            canEmail = (bool)rdr["CanEmail"];
                        }
                    }
                }
                catch (SqlException)
                {
                    return;
                }
                finally
                {
                    if (cmd != null)
                    {
```

-continued

[WebMethod]

```
                cmd.Dispose( );
                cmd = null;
            }
        }
        SqlCommand cmd1 = null;
        if (canEmail)
        {
            using     (SqlConnection    conn1    =    new
SqlConnection(WebConfigurationManager.AppSettings["TownsquareDB"]))
            {
                try
                {
                    conn1.Open( );
                    Events events = new Events(conn1);
                    NewsfeedEvent ev = events.GetEventString(eventIDstr, toffset,
Tokenizer.ContextTypes.EmailContext);
                    string    emsg    =    "<img    src=""    +
WebConfigurationManager.AppSettings["TownSquareUrl"]    +    "/"    +    ev.IconLocation    +
""> " + ev.Message;
                    People recipient = new People(conn1, ev.User);
                    People me = new People(conn1, alias);
                    cmd1 = new SqlCommand("spAddToEmailQueue", conn1);
                    cmd1.CommandType = CommandType.StoredProcedure;
                    cmd1.Parameters.AddWithValue("@eventId", eventID);
                    cmd1.Parameters.AddWithValue("@recipient", ev.User);
                    cmd1.Parameters.AddWithValue("@recipientname",
recipient.DisplayName);
                    cmd1.Parameters.AddWithValue("@commentername",
me.DisplayName);
                    cmd1.Parameters.AddWithValue("@eventmsg", emsg);
                    cmd1.Parameters.AddWithValue("@createtime",
DateTime.Now.ToUniversalTime( ));
                    cmd1.ExecuteNonQuery( );
                }
                catch (SqlException)
                {
                }
                finally
                {
                    if (cmd1 != null)
                    {
                        cmd1.Dispose( );
                        cmd1 = null;
                    }
                }
            }
        }
    }
}
```

Figure 6:
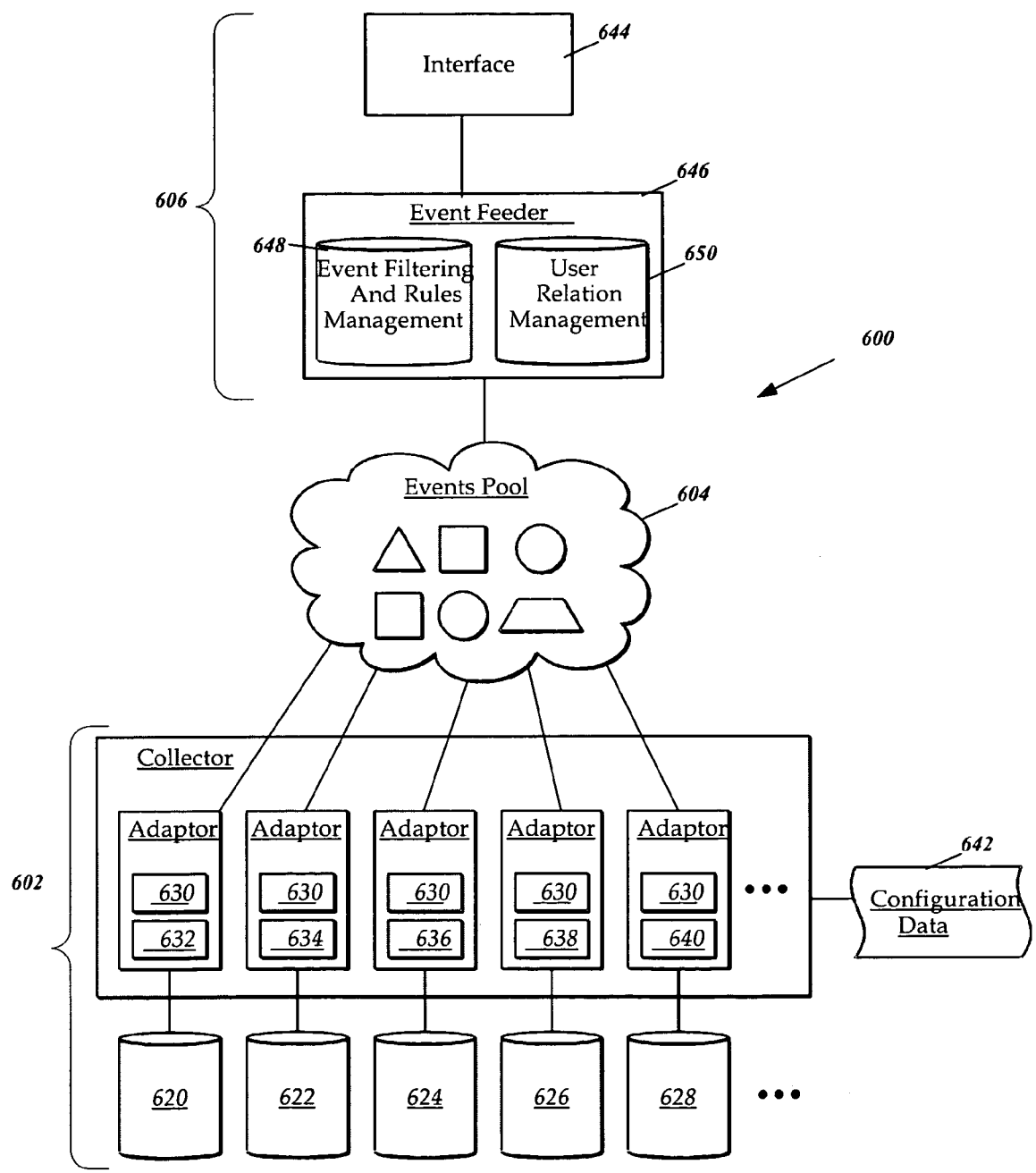
FIG. 6 is a block diagram depicting aspects of an exemplary social networking computing system.

FIG. 6 is a block diagram depicting aspects of an exemplary social networking computing system 600. The system 600 includes a data collection component 602, an events repository or pool 604, and an event feed component 606, but is not so limited. The data collection component 602 can operate to search through various information systems to identify events and other information associated with users of the system 600, providing the events and other information to the events pool 604. Correspondingly, the events pool 604 can be configured as data repository for events and other information associated with users of the system 600. The event feed component 606 can operate to formulate and present event feeds for targeted application users.

As shown in FIG. 6, the data collection component 602 includes a collector 608. While one collector 608 is shown, the system 600 can include additional collectors and other components. Each collector can include one or more adaptors depending in part upon current and future enterprise components and/or functionality. The collector 608 provides an execution and control environment for providing information as needed based in part on the use various adaptors 610-618. The collector 608 can be configured to control one or more of the adaptors, such as by controlling start, restart, stop, and/or other operations for example, when collecting information from the information systems 620-628.

The information systems 620-628 can include a variety of different types of information and other data, and are not limited to a type of information system. However, a number of example information sources are described below. One example information system may correspond to an administrative human resource system. Such a system may include when an individual was hired, wherein an associated adaptor can use the associated information to determine whether or not a hiring anniversary is approaching or occurring. As further example, the example system may also track birthdays for enterprise users, when there is a status change (e.g., promotion or other title change), and/or information regarding the placement a user within the organizational context or structure of an enterprise.

Another example information system may correspond to an enterprise directory and general attribute repository system, such as ACTIVE DIRECTORY for example. Such a system may also include titles, office numbers, organization context, etc., of various enterprise users. Yet another example information system may correspond with a user profile site into which an enterprise user can enter personal and other information. An enterprise user can use a profile site to include various personalized attributes (e.g., special interests), share files, upload photographs, etc.

Another example information system may provide instant messaging functionality that can be used to provide a status indicator to indicate information regarding certain enterprise users. The functionality can be used by an enterprise user regarding availability (e.g., "I will be at a client until 4:30 pm.—then working from home thereafter") and other instant messaging operations. Other exemplary information systems may correspond to enterprise calendar systems (such as EXCHANGE), document management systems, financial systems, etc. The types and number of information systems has no limit, and may include information systems that are now existing, or yet to be developed. A new or updated information system may be incorporated into the system 600 by implementing an appropriate adaptor.

One or more of the adaptors 610-618 can be configured to extract events regarding users of interest from a distinct type of information system (also referred to herein as an "information source"). For the enterprise example, as an individual engages in normal enterprise activity, information can be gathered from the user and various enterprise systems and used to generate an event feed for a targeted user. Based on the trends in computing advances, information may be rarely accumulated in any single information system of any single type. An enterprise may require multiple systems to maintain accumulated information regarding enterprise users in various information systems.

In various embodiments, and as described further below, one or more adaptors can be further configured to improve timeliness in delivering fresh events to application users. For example, one or more processing threads, processors, and/or processes can be used in association with one or more adaptors to provide information from one or more information sources to users of a social computing network. Adaptors 610-618 can be used to extract events and other information from various types of information systems. In one embodiment, each adaptor can be configured to extract events and other information from a particular type of information system. For example, adaptor 610 can be configured to extract events regarding enterprise users from information system 620 which is a particular type of information system. Adaptor 612 can be configured to extract events regarding enterprise users from information system 622, and so forth for the remainder of adaptors 614-618 and information systems 624-628.

The system 600 can also include other adaptors that can be configured to extract events from other information systems. Certain adaptors can be of different types having different functionalities, while other adaptors can be configured with similar or duplicate functionalities. For example, instantiating multiple adaptors for the same information system type can be helpful to obtain events in a timely manner and/or to obtain events for distributed information systems.

As one example, one or more of the adaptors 610-618 can configured as a plug-in component having a pre-constructed framework of adaptive functionality to facilitate effective authoring and generation of additional or reconfigured adaptors for new and/or current information technology systems and uses. For instance, each of the adaptors 610-618 can include a framework that incorporates a number of common services 630 and associated functionality. Exemplary common services 630 can include: 1) the procedures for connecting with an events pool, and placing an event into an events pool; a procedures for discovering an identity of a user of interest for which events are desired; 3) logging functionality; 4) an application programming interface (API) with the collector so that collector can control an adaptor; 5) state persistence; 6) other standard interactions with the system, etc. Continuing with the example, each of the adaptors 610-618 can be further configured to include functions 632-640. The functions 632-640 include logic used to determine types of queries to be made to various information systems, which includes knowledge of an appropriate API to use to properly interface with the corresponding information system, but are not so limited.

Although one collector 608 is shown in FIG. 6, it may be advantageous in some circumstances to have more than one collector. For instance, a plurality of collectors having one or more associated adaptors may be selectively or collectively used to extract events and other information from the various information systems in a timelier manner. Also, multiple collectors may be used to accommodate various network topologies and expanded geographical distributions. Configuration data 642 can be used to direct the collector 608 while operating. For example, the collector 608 can use the configuration data 642 to cause one or more of the adaptors 610-618 to start and stop at appropriate times.

Moreover, the configuration data 642 can be used to define which of the adaptors 610-618 that the collector 608 can instantiate and support. Accordingly, each of the adaptors 610-618 can be configured to respond to collecting instructions to gather events. The configuration data 642 can also be used to define when one or more of the adaptors 610-618 are to be used. As an example, the configuration data 642 can be used to control adaptors at periodic time intervals, wherein the time intervals can differ depending on an associated information system.

In an embodiment, as one or more of the adaptors 610-618 retrieve events, the retrieved events are communicated to the events pool 604. For example, the events pool 604 can include one or more database systems. As shown in the exemplary system 600 of FIG. 6, the events pool 604 includes a number of disparate events represented by a number of symbols corresponding to an event type. While a limited number of events are shown in events pool 604, the events pool 604 can include an enormous amount of data, including thousands, millions, or more of such events.

Events can be categorized into a number of types that makes logical sense, or which can be suitable in defining granularity for a particular event feed. As illustrated in the example system 600 events represented by the triangle are of a first type; events represented by the square are of a second type (e.g., two events having the second event type); events represented by the circle are of a third type (e.g., two events having the third event type); events represented by the parallelogram are of a fourth type, etc.

In one embodiment, the schema of FIG. 5 can be used to control aspects of a social computing experience. For example, schema 500 can be used to implement event types that include, but are not limited to: comments, a hiring anniversary, a birthday, blog entries, title changes, manager changes, profile changes, etc. The schema 500 can also be used to identify an application user who is associated with an event, comment, and/or a time of an event, comment, etc. The time can be used for sorting and/or presenting events and comments. The schema 500 can also be used to provide customizations appropriate to a specific type of event. For example, the customization functionality can be used for a manager change event to provide the name of a manager, a title of the manager, etc. As another example, the customization functionality can be used for a document change event to identify an associated document, location, author(s), describe the nature of a change, etc.

With continuing reference to FIG. 6, the event feed component 606 can operate to extract events from the events pool 604 in order to provide an event feed for an application user based in part on one or more associated users of interest. The event feed component 606 uses the events pool 604 in order to populate an event feed for viewing and further interaction by a user using the interface 644. Accordingly, if users of interest were to change for a particular user and/or if the type of event to be included in the event feed were to change, the change can be quickly presented in the associated event feed. All or a large percentage of events associated with users can be included in the events pool 604. Accordingly, fewer processing resources may be required to populate the events pool, enabling a greater number of processing resources to be used for extracting events for a particular event feed of an application user. Accordingly, application users may quickly see how a filtering change would change the event feed, and may thus quickly refine the filtering configuration for presenting an event feed and other information.

The event feed component 606 includes an event feeder 646 that can operate to perform a number of functions as part of providing an event feed. In one embodiment, the event feeder 646 can operate to: determine one or more users of interest that are associated with an application user or some other user (e.g., a commenting user); determine whether certain commenting functionality is enabled; determine event types for an application user based in part on associated users of interest; etc. For example, the event feeder 646 can use a tracking list to identify users of interest when generating an event feed for a particular application user.

The event feeder 646 includes an event filtering and rules management component 648, and a user relation management component 650, but is not so limited. The event filtering and rules management 648 can be used to identify certain event types to be included in certain event feeds users or groups of users according to a desired implementation. For example, the event filtering and rules management component 648 can be used to generate an event feed that includes events associated with certain users of interest and/or group of users of interest based in part on a defined tracking list.

The user relation management component 650 can be used to designate one or more users of interest for a group associated with a particular application user. The user relation management component 650 can optionally construct a default user relation for a given application user. For example, the user relation management component 650 can operate to consult information systems that the adaptors extract events and other information from. As an example of formulating a default membership in the group of a user, the user relation management component 650 can use (directly or indirectly) one or more enterprise information systems and selecting one or more users to be included within a particular group based in part on the accessed information.

As an example, the user relation management component 650 can operate to examine one or more information systems to identify an organizational context for an enterprise user. The user relation management component 650 can operate to automatically add any enterprise users that work in the same technical group to a user's co-workers group. The user relation management component 650 can also operate to examine a communication history (e.g., e-mail, instant messaging, texting, voicemail, etc.) to see who a particular user has been communicating with. The user relation management component 650 may automatically add any identified user's to a user's friends at work or some other group.

A formulation of a default network as described above for an enterprise differs substantially from many current social networking models that requires mutual collaboration in order for an individual to be added to a user's social network. Conventionally, in order to add an individual to a friends network, an invitation is first sent by the participant, and the recipient then accepts the invitation. They are then both mutually added to each other's network. Aspects of the foregoing enterprise-based social network differ in other ways. For example, a user of interest can be added to an application user's social network without the application user being added to the user of interest's social network. As further example, the application user has an option of categorizing a user of interest in more than one group. As yet another example, a commenting user can be automatically added to an application user's social network when a comment is made to an event associated with the application user.

The user relation management component 650 can operate to adjust a user relation for an application user when the application user removes or adds a user of interest to a particular group. Such operations can be performed without requiring the user of interest to proactively accept an invitation to join the group. The application user can also use the interface 644 to view and modify user relations, track users of interest, create and post comments, etc.

The user relation management component 650 can be used to suggest changes in user relations for a particular user. Based in part on a particular detection or circumstance, the user may be suggestively prompted to complete some operation. For example, the user relation management component 650 can be used to detect that a user is communicating more frequently with a particular associate. Thereafter, a user can be asked to add the particular associated to a friends at work or other group. Or, upon identifying a title change, the user can be suggestively prompted to add others within a new organizational context to a co-workers group, etc. In one embodiment, the user relation management component 650 can operate to impose policy rules regarding user relations. For example, the user relation management component 650 may deny a request to add a particular user to a particular group based in part on a defined rule of association. Or, perhaps a particular user has expressed an interest in keeping a birthday private, and not to be shared.

As a grouping example, a particular group of users can be defined to receive events of a certain event type (e.g., birthday events, hiring anniversary events, etc.). Another group of users can receive events having a different subset of event types. Accordingly, an event feed can be tailored to include event types based in part on a defined group. In one embodiment, if a user is included in more than one group, the superset of all the event types for any group can be used to generate events of an event feed. For example, suppose a first group corresponds to event types A, B, and C, and second group corresponds to event types C, D and E. Events associated with a user of interest can be reported regarding event types A, B, C, D, and E for a tracking user since the user of interest is associated with the first and second groups. The user relation management component 650 can make adjustments to event types and associated groups regarding a particular enterprise user. Accordingly, components of the system 600 can be used to provide a tailored event feed to a user.

The following description describes examples of providing an event feed using components of the system 600. For example, the event feeder 646 can be used to provide an event feed using events in the events pool 604. Events can be tracked regarding a particular application user by identifying one or more users of interest, event types, event times, etc. For example, the event feeder 646 may monitor user comments within the events pool 604 for comments that correspond to a user of interest as part of providing the event feed. Moreover, group memberships for multiple groups for a user can be monitored such as by using the user relation management component 650 for example. The event feeder 646 can determine which events and/or event types are to be fed to a user according to a particular group or groups.

As another example, in providing an event feed to an application user the event feeder 646 can operate to retrieve an event from the events pool 604 wherein the event is associated with a user of interest. In one embodiment, an event includes a user comment to an event associated with some user of interest. As part of the process, user relation management component 650 can be used to determine whether a user of interest is within a given group for a particular user. In making such a determination, the user relation management component 650 can identify specific groups of the application user, and whether a user of interest belongs to a particular group associated with the application user. If the user is not included in a group or a tracking list, the event will not be included within the event feed.

If the user of interest is included in at least one of the groups, an event type of an event corresponding to the group is identified. For example, assume that a group corresponds to event types, A, B and C. If the event is of a different type, it will not be included in the event feed. However, if the event is of one of event type A, B, or C, the event will be included in the event feed. There may be a particular format in which to present the event in the event feed. The event feeder 646 can extract a copy or some select portion of an event from the events pool 604 for presentation in a desired format according to preferences of the application user or some default application settings.

In various embodiments, a networked computing environment for establishing a social network can include a topology of servers, clients, devices, communication media, and/or other networking functionality. A networked computing environment can include a static or dynamic topology, a secure network such as an enterprise network, an unsecure or partially unsecure network such as with features of a wireless open network, the Internet, and/or some other network or combination of networks. By way of example, and not limitation, the networked computing environment can include wired media such as a wired network or direct-wired connection, and/or wireless media such as acoustic, radio frequency (RF), infrared, and/or other wireless media. Many other configurations of computing devices, applications, data sources, data distribution systems, etc. can be employed to implement browsing and other functionality. Moreover, exemplary systems and configuration are included for illustrative purposes and embodiments are not limited to the example applications, modules, devices, systems, processes, etc. described herein.

In various embodiments, components can be implemented as part of networked, distributed, and/or other computer-implemented and communication environments. Accordingly, components can be employed in a variety of computing/communication environments. For example, the system 100 can used with devices/systems having networking, security, and other communication components configured to provide communication functionality with other computing and/or communication devices. Moreover, the social networking functionality described herein can be used in conjunction with a desktop computer, laptop, smart phone, personal data assistant (PDA), ultra-mobile personal computer, and/or other computing or communication devices to provide an event feed associated with a social network.

While communication/computing architectures have been described herein, functionality of various components can be also combined or further divided. For example, in FIG. 1, the collector component can be configured to include filtering functionality of the filter component and/or tracking functionality of the tracking component. Furthermore, various embodiments described herein can be used with a number of applications, systems, and other devices and are not limited to any particular implementation or architecture. Certain components and functionalities can also be implemented in hardware and/or software. While certain embodiments include software implementations, they are not so limited and also encompass hardware, or mixed hardware/software solutions. Also, while certain functionality has been described herein, the embodiments are not so limited and can include more or different features and/or other functionality. Accordingly, the embodiments and examples described herein are not intended to be limiting and other embodiments are available.

Exemplary Operating Environment

Figure 7:
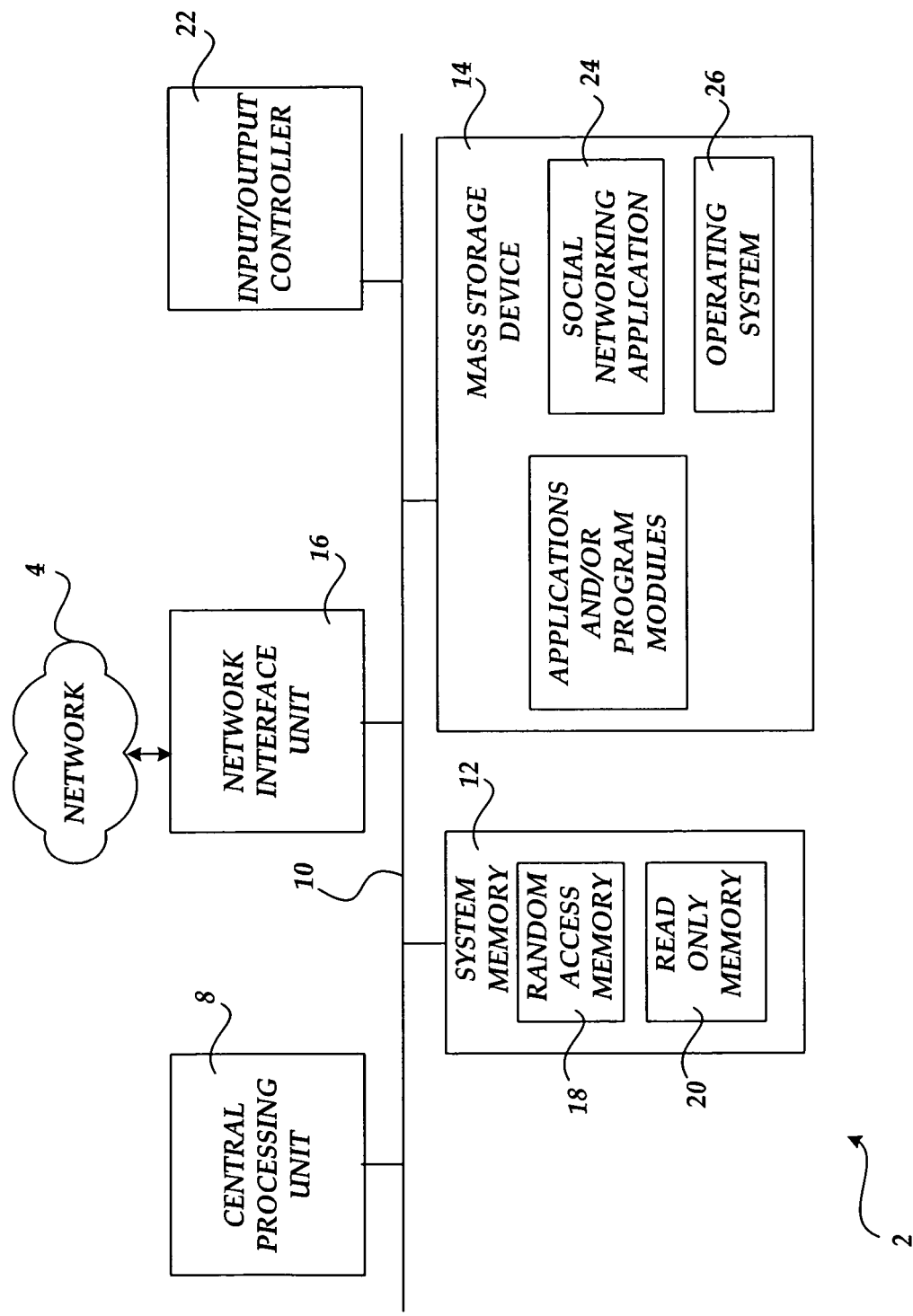
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computing device 2 comprises a general purpose desktop, laptop, handheld, tablet, or other type of computer capable of executing one or more application programs. The computing device 2 includes at least one central processing unit 8 ("CPU"), a system memory 12, including a random access memory 18 ("RAM"), a read-only memory ("ROM") 20, a textual store 25, and a system bus 10 that couples the memory to the CPU 8. A basic input/output system containing the basic routines that help to transfer information between elements within the computer, such as during startup, is stored in the ROM 20.

The computing device 2 further includes a mass storage device 14 for storing an operating system 26, application programs, and/or other program modules. The mass storage device 14 is connected to the CPU 8 through a mass storage controller (not shown) connected to the bus 10. The mass storage device 14 and its associated computer-readable media provide non-volatile storage for the computing device 2. Although the description of computer-readable media contained herein refers to a mass storage device, such as a hard disk or CD-ROM drive, it should be appreciated by those skilled in the art that computer-readable media can be any available media that can be accessed or utilized by the computing device 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 2.

According to various embodiments, the computing device 2 may operate in a networked environment using logical connections to remote computers through a network 4, such as a local network, the Internet, etc. for example. The computing device 2 may connect to the network 4 through a network interface unit 16 connected to the bus 10. It should be appreciated that the network interface unit 16 may also be utilized to connect to other types of networks and remote computing systems. The computing device 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computing device 2, including an operating system 26 suitable for controlling the operation of a networked personal computing device, such as the WINDOWS operating systems from MICROSOFT CORPORATION of Redmond, Wash. for example. The mass storage device 14 and RAM 18 may also store one or more program modules. The mass storage device 14, or other storage, and the RAM 18 may store other application programs or modules, including a social networking application 24.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of a computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow.

Accordingly, it is not intended that the scope of the invention in any way be limited by the above description, but instead be determined entirely by reference to the claims that follow.

What is claimed is:

1. A method of providing information to one or more users of an enterprise-based social networking computing environment comprising:
   generating an informational feed that includes enterprise-based system-generated events associated with one or more users of interest of the enterprise-based social networking computing environment based in part on an organizational context of an enterprise to generate the enterprise-based system-generated events;
   providing a comment to an enterprise-based system-generated event associated with a defined user of interest;
   updating the informational feed to delineate the comment interleaved with the enterprise-based system-generated events to display comment information as part of the informational feed; and,
   providing an updated informational feed including the comment information to a tracking user and automatically adding a commenting user associated with the comment to a tracking list of the tracking user without requiring mutual collaboration in order for the commenting user to be included in the tracking list of the tracking user.

2. The method of claim 1, further comprising expanding the enterprise-based social networking computing environment to include the commenting user who commented on the enterprise-based system-generated event and displaying the comment as an event in the informational feed of the tracking user including one or more of expanding the tracking user's social network when a user who is not presently defined as a user of interest comments on an event of a user who is defined as a user of interest and when a user who is presently defined as a user of interest comments on an event of a user who is not defined as a user of interest.

3. The method of claim 1, further comprising providing comments to one or more of the enterprise-based system-generated events as part of an Intranet-based social networking computing system.

4. The method of claim 1, further comprising generating a message to inform the tracking user of one or more comments.

5. The method of claim 1, further comprising providing the comment to one or more users being tracked by the tracking user.

6. The method of claim 1, further comprising expanding the enterprise-based social networking computing environment to one or more users of interest of the tracking user including automatically generating the enterprise-based system-generated events using a number of back-end systems as a result of users doing normal work.

7. The method of claim 1, further comprising:
   retrieving the enterprise-based system-generated events associated with one more monitored users from back-end systems of an enterprise-based computing network; and,
   including the enterprise-based system-generated events in the informational feed.

8. The method of claim 1, further comprising including one or more comments in an event feed of another user based in part on an affiliation with a commenting user.

9. The method of claim 1, further comprising including one or more comments in an event feed of another user based in part on an affiliation with the tracking user.

10. The method of claim 1, further comprising including adding a commenting user as a user of interest to a tracking list of the defined user of interest.

11. The method of claim 1, further comprising compressing a comment by an associated enterprise-based system-generated event when the comment and associated enterprise-based system-generated event occur within a defined amount of time.

12. The method of claim 1, further comprising including the comment and information associated with a commenting user as part of the informational feed and automatically adding the commenting user to the tracking list to then populate the informational feed with events associated with the commenting user.

13. A system configured to provide a social computing environment comprising:
   processor and memory resources;
   a collector to collect information using one or more back-end systems associated with users of the system;
   a filter to filter the collected information and provide enterprise-based events associated with one or more users of interest;
   a comment component configured to provide commenting functionality to system users;
   a feed generator to create an enterprise-based event feed that includes the one or more filtered events based in part on an organizational context of an enterprise and information associated with one or more user comments, provide the enterprise-based event feed to a target user, and update the enterprise-based event feed to delineate one or more user comments interleaved with the enterprise-based events to provide comment information as part of the enterprise-based event feed; and,
   a user relation management component to automatically add one or more commenting users to an enterprise-based social network of the target user without requiring mutual collaboration in order for commenting users to be included in tracking lists of a tracking users.

14. The system of claim 13, wherein the comment component can operate to inform a user of a user comment.

15. The system of claim 13, wherein the feed generator can populate the enterprise-based event feed with a user comment, including a time and an identity of a commenting user.

16. The system of claim 13, the user relation management component to expand a user's social network by automatically adding a commenting user to a tracking list of the defined user of interest.

17. The system of claim 16, wherein the feed generator can provide one or more enterprise-based events associated with a tracking user in an event feed of the commenting user.

18. A computer-readable storage medium with instructions which, when executed, provide an interactive social network by:
   creating an event stream that includes enterprise-based system-generated events associated with one or more enterprise users, wherein the event stream can be tailored for a tracking user;
   receiving a comment associated with an enterprise-based system-generated event of the event stream;
   interspersing the comment with the event stream including updating the event stream to delineate the comment interleaved with the enterprise-based system-generated events when displaying comment information as part of the event stream;
   automatically adding a commenting user associated with the comment to the interactive social network of the tracking user; and,
   providing the event stream including the comment information to the tracking user.

19. The computer-readable storage medium of claim 18, wherein the instructions, when executed, further provide the interactive social network by expanding a personalized social network of the tracking user by adding the commenting user to a tracking list without the tracking user having to proactively supply information to the interactive social network.

20. The computer-readable storage medium of claim 18, wherein the instructions, when executed, further provide the interactive social network by alerting the tracking user of a user comment by indicating a number of comments associated with an event of the event stream.

* * * * *